July 21, 1970  L. MICHNIK  3,521,279

MOBILE CLOCK SYNCHRONIZATION TECHNIQUES

Filed Aug. 20, 1968

INVENTOR.
LEWIS MICHNIK
BY
Alexander & Dowell
ATTORNEYS

United States Patent Office 3,521,279
Patented July 21, 1970

3,521,279
MOBILE CLOCK SYNCHRONIZATION TECHNIQUES
Lewis Michnik, Buffalo, N.Y., assignor to Sierra Research Corporation, a corporation of New York
Filed Aug. 20, 1968, Ser. No. 754,073
Int. Cl. G01s 9/56
U.S. Cl. 343—6.5      10 Claims

ABSTRACT OF THE DISCLOSURE

The accurate synchronization of mobile unit time clocks with an established worldwide time which is divided into cyclic epochs of repeating time slots, the invention including novel fixed-position interrogators associated with specific transponder ground stations of the VOR/DME, TACAN or VORTAC type, each interrogator being synchronized to said worldwide time and interrogating one or more transponder gorund stations to cause its replies to be synchronized to said worldwide time and therefore useful to said mobile units as special synchronization signals, the mobile units having means for identifying those special synchronization signals and using them to correct their local time clocks, the propagation time of the special signals from the ground station to the mobile unit being compensated for by using the ordinary DME capability of the aircraft cooperating with the DME feature of the ground station selected by it.

---

Figure 1:
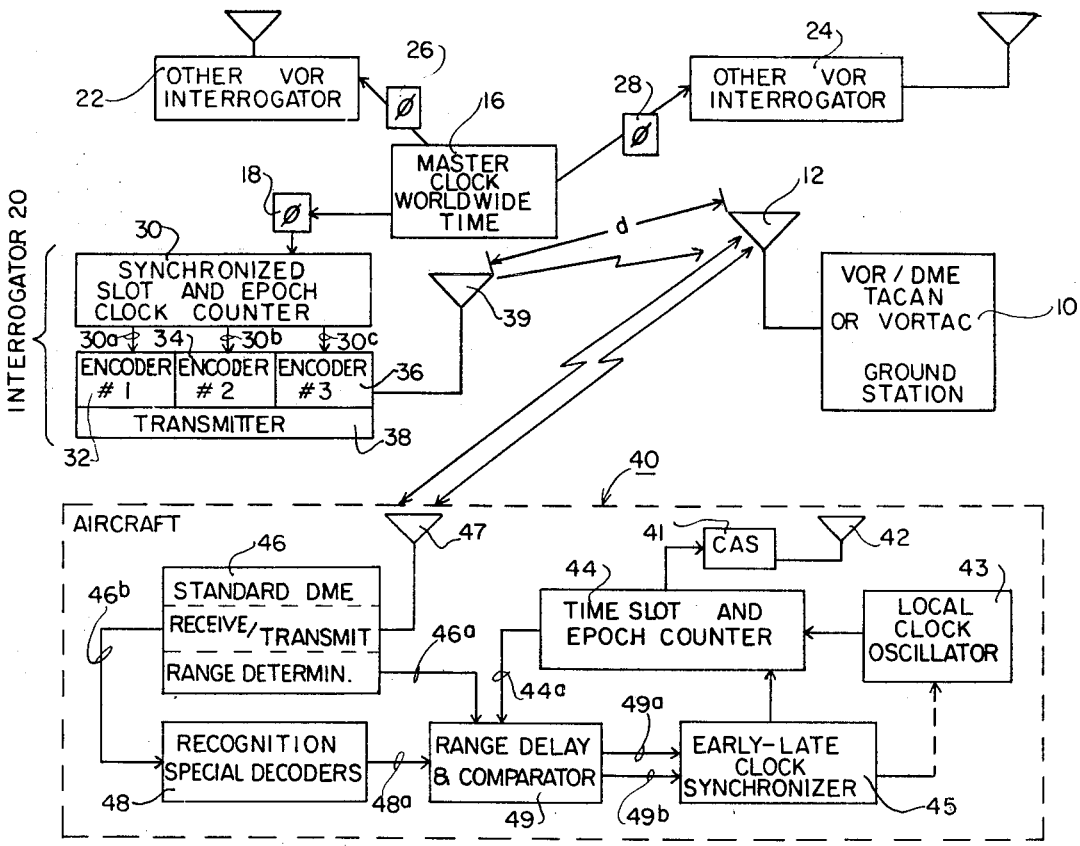

This invention relates to clock synchronization in cooperative time sharing techniques of the aircraft Collision Avoidance Systems (CAS) type, and more particularly to a way of utilizing the existing numerous VOR/DME, TACAN and/or VORTAC ground stations, without making any changes whatever therein, for the purpose of synchronizing the clocks in mobile units with an established worldwide time, such mobile units being assumed to already have distance measuring equipment (DME) cooperative with the DME located in the above-mentioned ground stations.

The present invention teaches the use of novel ground-station interrogators, all of which are synchronized to said worldwide time, and said interrogators themselves being located on the ground and operative to trigger specific ground-stations to cause the latter to send out replies comprising special coded pulse group signals receivable by a receiver in the mobile unit which also uses its own DME capability to determine a time factor proportional to range to the selected fixed station whose transmissions include both normal DME replies to the interrogating aircraft, plus the said special synchronization pulse groups representing CAS worldwide time. Having thus determined the signal propagation time between the aircraft unit and the ground station, the aircraft unit then uses this time together with the special synchronization signals, transmitted by the ground station in response to the above-mentioned novel interrogators, to correct any difference between the established worldwide time and the local clock time in the aircraft.

This invention will be described against the background of specifications issued by the Air Transport Association of America (ATA) for a collision avoidance system (CAS) designed primarily to be used by commercial carrier aircraft, in which a network of fixed-position CAS units are proposed which would all be very accurately synchronized together, within approximately one-half microsecond, to establish a worldwide time system to which the aircraft then synchronize themselves. Each aircraft which is equipped to participate in the system occupies its own time slot of 1500 microsecond duration in a cycle, or epoch, of time slots which repeat every three seconds. At a predetermined instant within its own time slot the aircraft transmits its own CAS ranging signal comprising a coded pulse group, as well as other information signals as described in the specification. Other aircraft receiving that ranging signal can determine the range to the transmitting aircraft by determining the transit times of such received signals as measured by their own clocks. The fixed CAS stations in said network transmit clock synchronizing pulse groups to mobile units during the first time slot in every second repeating epoch of time slots, the first such slot being designated as slot 0000. The ATA specification also provides for the possibility of providing limited equipments for smaller aircraft omitting as many of the complexities as possible, but retaining limited capabilities for operation in a so-called "back-up" mode which may be acceptable to some categories of users. The ATA specification proposes the building of a number of accurately synchronized ground stations, probably each including an atomic clock, and means for keeping them mutually synchronized, and further proposes to add to each fully-equipped aircraft and to each ground station a complex synchronization system for exchanging pulses for the purpose of compensating for the propagation delay of the synchronizing pulse group which is periodically transmitted by the ground station to the aircraft in question, perhaps once per two epochs. Typical examples of the type of sophisticated pulse exchange equipment necessary to eliminate the propagation time delay and thereby achieve mobile-unit clock synchronization are shown in Michnik et al. Pat. No. 3,336,591, Perkinson Pat. No. 3,258,896, Graham Pat. No. 3,183,504, Minneman Pat. No. 2,869,121, etc. These are complex and expensive systems.

It is a principal object of the present invention to provide separate interrogators located on the ground near unaltered transponder ground stations of the VOR/DME, VORTAC and/or TACAN type to trigger the latter in synchronism with worldwide time to transmit special synchronization signals while at the same time using the normal DME capability of the ground station to provide accurate distance measurements to DME-equipped mobile units, and to thereby simplify the above-mentioned synchronization techniques without degrading system performance.

In copending patent application Ser. No. 710,990, filed Mar. 6, 1968, Lewis Michnik discloses a unit to be carried by an aircraft and used to acquire synchronization with ground-station worldwide time in the particular case where there happens to be a VOR/DME, TACAN or VORTAC located near the synchronized CAS ground station, such aircraft using its conventional DME to measure range to that station, instead of having to use the more complex and expensive prior art pulse-exchange systems mentioned above, in order to compensate for the propagation time of the ground station's synchronizing pulse group to the aircraft.

Copending patent application Ser. No. 754,074 filed Aug. 20, 1968, teaches that only part of the ATA proposed CAS equipment need be newly added according to that invention wherein existing VOR/DME, VORTAC and/or TACAN stations are themselves synchronized to worldwide time and are augmented to include suitable means for transmitting coded synchronizing pulse groups to aircraft using their DME facilities, it being pointed out that there is an important advantage to be derived from combining the proposed CAS facility with existing VOR/DME, VORTAC or TACAN stations because each VOR/DME, VORTAC or TACAN already includes the capability of providing range measurements to aircraft, and furthermore that most aircraft of any size already include the necessary mobile DME unit required to cooperate with these existing ground stations.

The present invention seeks to retain all of the advantages set forth in the above copending patent applications, perhaps improving upon some of them. However, this invention recognizes that insofar as alterations in existing VOR/DME, TACAN or VORTAC stations are proposed, such changes may meet with resistance, not for reasons of any technical difficulty, but rather for governmental, jurisdictional, administrative or cost considerations. This invention therefore proposes that novel ground station interrogators comprising small individual units be mounted at, or near, participating VOR/DME, TACAN or VORTAC stations, and that the interrogators all be synchronized to a master-clock worldwide time using any suitable means, so that the said interrogators transmit to their companion ground stations interrogations pre-timed to trigger the ground stations to reply at instants exactly synchronized with the time slots and/or epochs of said worldwide time. When properly interrogated, any such transponder ground station must reply, and its reply can be distinctively encoded to show that it comprises a special synchronization signal, this being accomplished by interrogating the ground station with suitably encoded pulse groups. This novel technique leaves the existing ground station completely untouched by any alternation whatever. On the other hand, the participating aircraft must be provided with means to recognize such special synchronization transmissions of the VOR/DME, TACAN or VORTAC, either by their coded characteristics, or by searching all the ground stations' transmissions for pulse groups which are mutually separated by the predetermined and established repetition rate of the special synchronization signals, or by both techniques.

The exact means by which synchronization is achieved in the network of the ground interrogators associated with participating VOR/DME, VORTAC or TACAN stations forms no part of the present invention, and may be the same scheme as would be used to synchronize master ground CAS stations as proposed by the ATA specification. For instance, the stations might be interconnected by wires or by satellite communication using suitable time delay phasing circuitry, or they might be synchronized by pulse schemes of the type for instance suggested by Minneman Pat. No. 2,869,121. As a further alternative, they might be synchronized by atomic clocks physically carrier from one location to another by an aircraft, the latter scheme being workable to span a large uninhabited area, such as a desert or an ocean.

Another major object of the invention is to provide means by which an aircraft can identify those signals transmitted by a transponder ground station in synchronism with worldwide time, while at the same time ignoring all of the other extraneous signals transmitted by the same station, for instance representing its own rotating antenna pattern signals, or reply signals responsive to DME interrogations from other aircraft.

The prior art provides a number of systems by which an aircraft can identify replies from remote transponders of this type especially when the replies are responsive to interrogations made by the aircraft itself. These techniques are normally of the searching or strobing variety and are based upon the fact that a reply to an interrogating aircraft stands substantially still in time with respect to the moments of transmission by the aircraft, such replies returning at a moment which is later than the interrogation transmission by a virtually constant time interval approximating twice the signal propagation time to the ground station. In such prior art systems the interrogation repetition rates of all aircraft are made different by providing each with an intentional random "jitter" to avoid the possibility that two aircraft might have their pulse repetition frequencies become for a while substantially identical whereby one aircraft might mistake ground station replies initiated by transmissions of said other aircraft.

Another object of the present invention is to teach a system by which a participating aircraft can identify special synchronization signal pulses which were initiated, not by its own transmitter, but rather by a ground interrogator transmitter which is synchronized to worldwide time. This is a problem because the aircraft has no signal, initiated within its own equipment, which is necessarily phase-related to the synchronization signals initiated from the ground station by the latter's associated interrogator unit, also on the ground.

The present invention solves this problem in two ways, first by having the aircraft search for ground station signals which are spaced apart by a certain number of microseconds known to relate to the spacings of the worldwide time-slot and epoch events in response to which the interrogator transmits its pulse signals to which the ground stations are replying; and second, by having the ground interrogators interrogate the transponder ground stations in groups of pulse pairs wherein the groups are spaced apart in an encoded manner which identifies them as being synchronization signals. Moreover, since the worldwide time is in fact a cyclic series of time slots which are repeated during successive epochs, the beginning or ending of each epoch or number of epochs can be identified by differently encoded pulse pair groups so that the receiving aircraft can synchronize not only its time slots, but also the successively occurring epochs.

Another important object of the invention is to provide relatively simple ground-located interrogators which are synchronized to worldwide time, and each of which interrogates a transponder ground station at its assigned frequency by which it is identified. Furthermore, where ground stations are located relatively close together, a single interrogator may interrogate plural different ground stations using several transmitters operating on different frequencies, such an interrogator using the same encoders and synchronized time keeping means, but requiring different delay means by which the several transmissions can be properly phased to eliminate differences in range from the interrogator to each transponder station which it interrogates.

A further object of this invention is to provide economical and relatively simple apparatus for accomplishing the above objects of the present invention.

Figure 2:
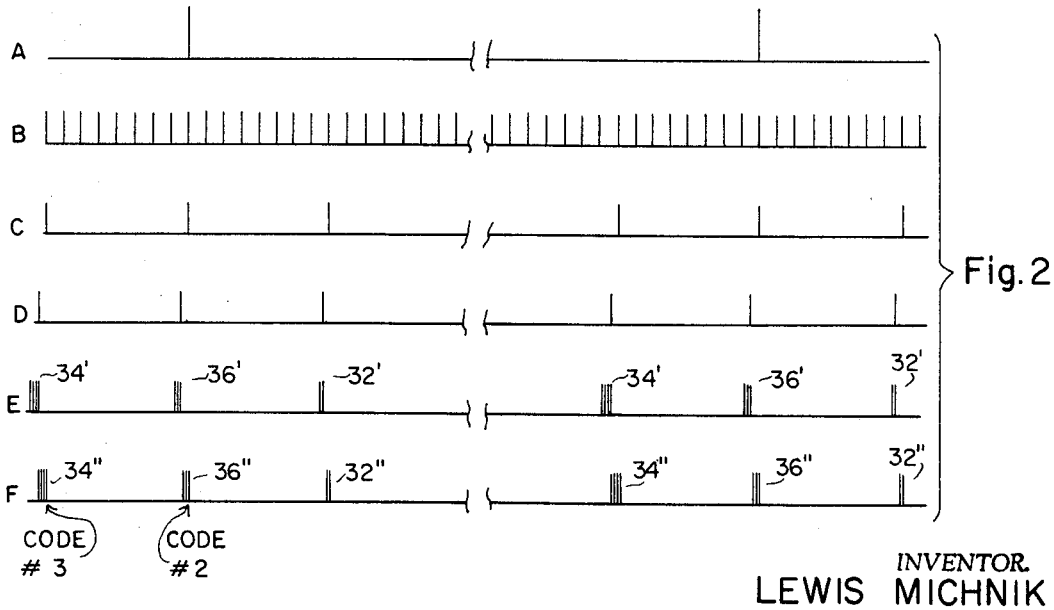
Figure 3:
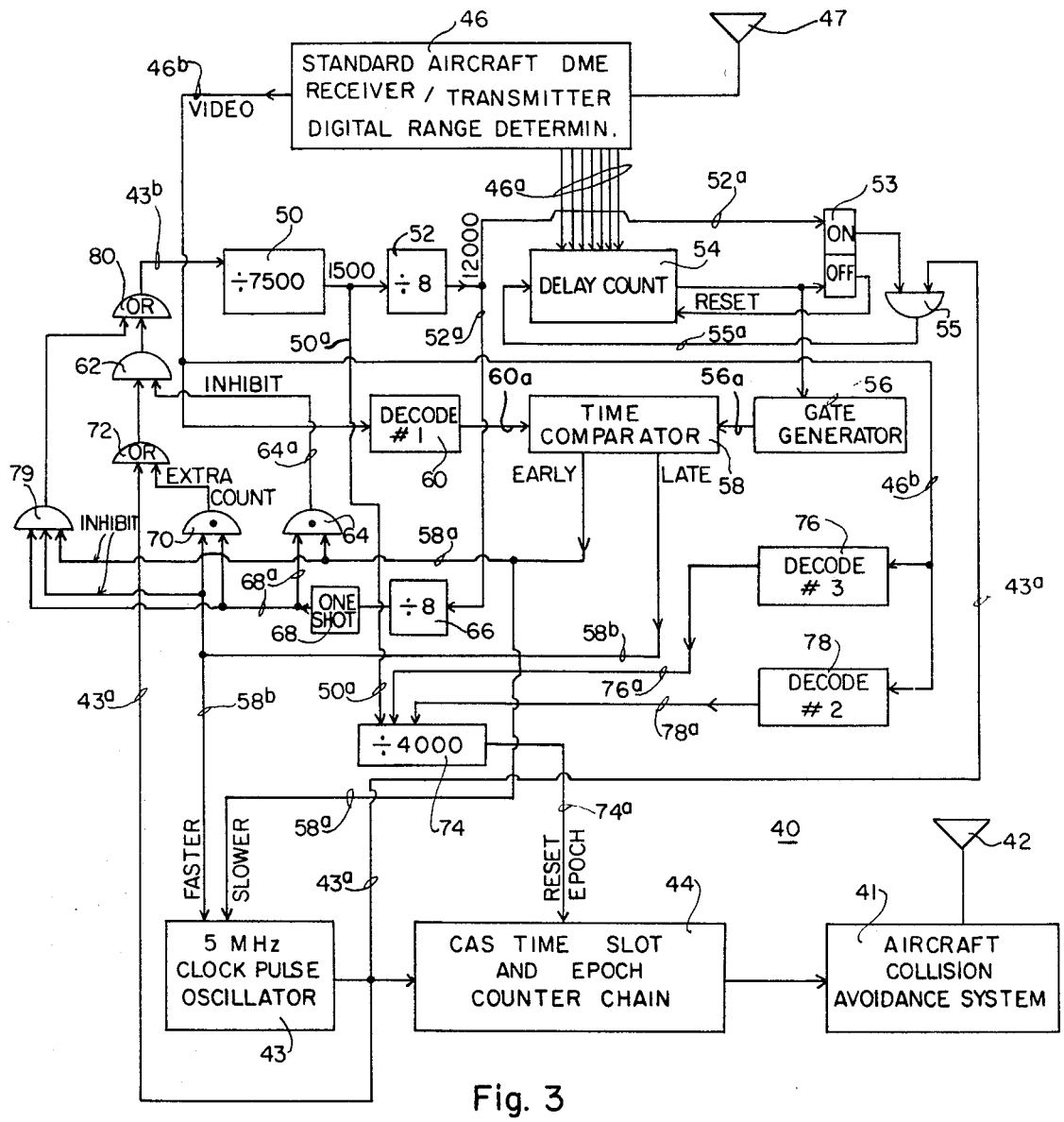

Further objects and advantages thereof will become apparent from the following discussion of the drawings wherein:

FIG. 1 is a composite block diagram showing a standard transponder ground station being interrogated by an associated fixed-position interrogator and at the same time cooperating with a mobile (aircraft) unit to provide not only range measurements with respect thereto but also worldwide clock synchronization signals, and the diagram showing several other ground station interrogators synchronized to the same master clock;

FIG. 2 comprises a graphical diagram showing five collimated pulse traces indicating the relative timing of events in the system according to the present invention; and FIG. 3 is a block diagram showing in greater detail an exemplary pulse recognition and synchronization system within an aircraft.

Referring now to the drawings, FIG. 1 shows a typical ground station 10 of the general type which includes VOR/DME, TACAN and/or VORTAC stations. This type of ground station includes a suitable antenna 12. FIG. 1 also shows a master clock 16 representing the source of worldwide time and connected by suitable signal transit-time compensator means represented in the present embodiment by a phasing unit 18 to a ground interrogator generally represented by the reference numeral 20. The master clock 16 is also assumed to be connected to other ground-station interrogators such as the interrogator 22 and the interrogator 24 which are remotely located and are coupled to the master clock 16 by other transit-time compensator units 26 and 28. These other interrogators serve to interrogate other remotely located transponder ground stations which are not shown in the present diagram.

Referring again to the interrogator 20, it includes a clock counter 30 which is precisely synchronized to the master clock 16 and is adequate to count out intervals of time which represent the moments of occurrence of predetermined events within each cyclically repeating epoch of time slots. Assuming the use of time slots and epochs specified in the above-referred to ATA specification, each epoch would be three seconds in duration (with every other epoch assigned to the ground synchronization mode) and would be divided into time slots each of which is 1500 microseconds long. For illustrative purposes, the present invention selects certain arbitrary times within each epoch as comprising the moments for synchronization-signal transmission, usually the boundaries of certain equally spaced time slots, described in greater detail in connection with FIG. 2 of the present drawing. Each interrogator, such as the interrogator 20, will interrogate its associated ground station such as the station 10 using the RF frequency assigned thereto, and these interrogations will trigger replies from the ground station being interrogated, the replies comprising transponder responses occurring at definitely predetermined moments within each epoch. In order to provide a large number of such synchronizing responses from the ground station 10, the interrogator 20 in the present illustrative example will interrogate the ground station once for each eighth successive time slot, so that the ground station 10 will deliver synchronizing pulses every 12,000 microseconds. All interrogations and all resulting transponder replies by the ground station are in the form of coded pulse pairs according to standard practice in connection with the VOR/DME, TACAN and VORTAC stations. In the present example, three different pulse encoded groupings are used by the interrogator at different times during the epochs. Every 12,000 microseconds (eight time slots) the encoder #1 labeled 32 in FIG. 1 interrogates the ground station 10 with a first encoded pulse pair group, for instance comprising one pulse pair of the standard VOR/DME, TACAN and VORTAC spacing including two narrow pulses spaced apart by a 12 microsecond interval so that a reply pulse pair will be delivered by the ground station 10 in response thereto. In this way, the boundary between each group of eight time slots can be made to serve as a synchronization signal event which the code #1 will identify to each aircraft, and each such code group will be transmitted in synchronization with worldwide time by the ground station 10 and will be recognized by airborne stations by its periodicity. However, this code alone would not be adequate to indicate the beginning or the ending of an epoch and therefore for this purpose, the present invention uses two additional codes provided by the encoder #2, labeled 34 in the drawing, and the encoder #3, labeled 36 in FIG. 1. The encoder #2 provides distinctive pulse pair groups during the end of the last 12,000 microsecond interval in every other epoch marking the end thereof, for instance the pulse pair groups in this encoding comprising four successive pulse pairs spaced apart by 200 microseconds. However, since there is always the possibility that these pulses might be blotted out momentarily by noise, or be obscured by antenna pattern position markers or by responses of the ground station 10 to interrotations transmitted by other aircraft in the vicinity, the present invention proposes that at the end of the next to last 12,000 microsecond interval in every other epoch, for example another group of pulse pairs be encoded according to the #3 code, for instance comprising four pairs of pulses spaced apart by 220 microsecond intervals. These two different coded groups occurring near the ending of every second epoch should be adequate to provide an aircraft with clearly recognizable pulse codes useable by the latter to mark the cycle of each epoch. Each interrogator further includes an RF transmitter 38 driving an antenna 39 located near the antenna 12 and perhaps spaced therefrom by an accurately known distance $d$.

Since it is desirable that the ground station 10 actually transmit its special replies, comprising worldwide time synchronization signals, precisely in synchronism with the divisions between time slots and/or epochs, a time advancement must be made in the interrogations, for instance by proper adjustments of the phasing units 18, 26 and 28, to obviate the several delays occurring between the time of transmission by the transmitter 38 of a code pulse group and the moment of reply by the ground station 10. These delays include fixed and known transponder delays added to the delay caused by the fact that the antenna 39 is spaced from the ground station antenna 12 by the distance $d$. The total amount of this delay can therefore be determined by adding the system delays and the propagation time of the signal through the distance $d$ to obtain a total number of microseconds by which transmissions from the interrogator 20 must lead replies from the ground station 10 in order to have the latter transmit in precise synchronism with worldwide time. These delays are easily compensated out by moving the various outputs taken from the clock counter 30 to somewhat earlier moments in the counting chain so that the actual counts used to drive the encoders 32, 34 and 36 are earlier than the selected synchronization moments according to the master clock 16 by the aforesaid composite delay interval. Thus, the system described so far provides specially encoded signals transmitted by the ground station 10 to mark the boundary of each eighth time slot and to mark the boundary of each epoch in a very clear manner.

FIG. 1 also shows a simplified block diagram of a system located in an aircraft which is equipped to cooperate with the above-discussed ground system to synchronize its own local time clock with the master-clock worldwide time, for instance for collision avoidance purposes. The collision avoidance equipment within the aircraft mobile unit 40 is labeled 41 and is connected to an antenna 42 of any suitable type. The present disclosure will not further discuss the collision avoidance system because the details of the system are of no importance to the present invention, and because there are a large number of such collision avoidance systems already described in other patents. It is sufficient to say that the collision avoidance system used in the present invention is of the type requiring accurate mobile time clock synchronization, and therefore the diagram of FIG. 1 shows a local time clock including a clock oscillator 43 driving a time slot counter chain 44 and synchronized by means of a suitable time clock synchronizer 45 to the signals received from the ground station 10 as described above, and as further described in connection with FIGS. 2 and 3, hereinafter.

The local aircraft unit also includes a standard DME 46 which includes a receiver and a transmitter both connected to a suitable antenna 47 and which further includes range determining means which is a part of the standard DME 46 and determines range to the ground station, as is well known per se in the prior art. Assuming this to be a digital DME, the range determination is delivered by output on a group of wires 46a, FIGS. 1 and 3. The video output from the receiver within the DME 46 is taken out on the wire 46 b and is delivered to a recognition circuit 48 including special-signal decoders whose details are further described in connection with FIG. 3. However, suffice to say for the moment that the purpose of the recognition circuit is to recognize the special synchronization signals transmitted by the ground station 10 in response to interrogations from the interrogator 20, in the presence of other signals transmitted by that ground station, also in the presence of other spurious signals which may be initiated by other sources. These encoded signals are delivered on the wire 48a to a comparator circuit 49 which compares their time of arrival with the momentary count in the time-clock counter 44 appearing on wire 44a. However, assuming the counter 44 is actually synchronized with worldwide master-clock time, the decoded events appearing on the wire 48a will be late by a time interval equal to their travel time to the aircraft from the ground station 10. Therefore, before a comparison is made in the circuit 49, the local clock signals arriving on wire 44a are delayed by an amount as determined by the range signals appearing on the wires 46a. When the comparison has been made by the comparator 49, it will issue an "early" signal on wire 49a, or a "late" signal on wire 49b, and these signals will actuate a clock synchronizer 45 for making appropriate corrections in the local time clock as will be described more fully in connection with FIG. 3.

FIG. 2 shows a timing pulse diagram illustrative of the manner in which the interrogator 20 interrogates the ground station 10 and the manner in which the latter replies with suitably coded pulses. The top line of pulses labelel A includes two pulses delivered by the master clock 16 to indicate the beginnings of every other epoch in the repeating time-slot cycle. These pulses occur simultaneously with similarly located pulses along the line marked B. The pulses on line A are six seconds apart indicating the length of two epochs, but the pulses on line B are 1500 microseconds apart, indicating individual time slots occurring during each epoch. There are a large variety of possible code groups which could be used in a system of the present type to trigger the ground station 10 in synchronism with CAS worldwide time, and thereby produce replies from the ground station which would be recognizable in the air by the mobile units. For purposes of the present illustration, an exemplary set of pulse groups has been selected for transmission by the interrogator 20 at precise intervals, namely every 12,000 microseconds (or eight CAS time slots). On line C of FIG. 2 are shown the boundaries of successive new time intervals of 12,000 microseconds duration.

As mentioned above, however, the actual interrogation of the transponder ground station will be made by coded pulse groups as required to be recognized by the ground station for response, probably pairs. These pulse pairs can be generated at exact rates or in predetermined groups to make them readily identifiable. It will also be recalled that there were two types of delays involved in the interrogation, and the reply by the ground station, namely inherent transponder delays which must be added to the delay caused by the spacing d between the interrogator antenna 39 and the ground station antenna 12. These delays make it necessary to offset in the advanced direction all interrogations by the transmitter 38 by a fixed number of microseconds and this offset is graphically represented by the fact that the markers in line D of FIG. 2 are offset to the left with respect to the markers of line C, the latter indicating exact moments in the CAS time cycle. As mentioned above, this is a constant offset and can be made simply by altering the logic slightly which selects the various time intervals in the interrogator clock 30 and delivers them to enable the encoders 32, 34 and 36 via the wires 30a, 30b and 30c in FIG. 1.

The encoder #1 marked by the reference character 32 delivers pulse pairs having a certain spacing as represented at 32' on line E of FIG. 2, and these pulse pairs generally represent the commencement of each eighth time slot, except for the two occurring just prior to the end of every other epoch. The encoder #3 develops grouped interrogation pulse pairs which are mutually spaced by 220 microseconds and are labeled 34' on line E of FIG. 2, these pulse pairs indicating the penultimate group before the commencement of every other new epoch. Finally, the encoder #2 develops the final interrogation pulse group labeled 36' which occurs immediately prior to the end of every other epoch and comprises four pairs spaced apart by 200 microseconds in the present illustrative example. Note that the last pulse in all of these groups 32', 34' and 36', line E, always occurs in the same location as the markers indicated on line D in FIG. 2 and therefore somewhat prior to the commencement of the worldwide time event which the pulses are intended to mark. These pulses are then transmitted by the antenna 39 to trigger the ground station 10 and cause it to transmit pulse groups 32'', 34'' and 36'' as shown on line F of FIG. 2. It is to be noted that the last pulse in each of the double-primed groups coincides with the markers on lines A and C of FIG. 2 representing worldwide time cycle events, namely the beginning of certain time slots and of epochs. Thus, the synchronization-signal pulses transmitted as shown on line F by the ground station 10 correspond in coded character with the interrogation pulses transmitted on line E by the interrogator, but have been delayed in time so that they fall exactly upon the corresponding events occurring according to worldwide master-clock time. It is the pulses appearing on line F which are then received by each participating aircraft and used for the purpose of synchronizing its own time clock as will be described in connection with FIG. 3.

FIG. 3 shows a more detailed block diagram representing the (aircraft) mobile unit corresponding to the contents of box 40 in FIG. 1. The diagram of FIG. 3 shows a collision avoidance system 41 and antenna 42 whose operation is timed by a clock including a pulse oscillator 43 driving a clock counter chain 44. The aircraft also includes a standard aircraft DME 46 connected to an antenna 47 and having two different outputs, namely a digital multiple-bit output on the group of wires 46a representing the range to the ground station, and another wire 46b brought out from the receiver which contains all of the video detected by the receiver, which forms a part of the standard DME 46. The signals on the video wire 46b include the desired synchronization pulse groups, but they also include many pulses and pulse groups which are not significant to clock synchronization, such as reply pulses transmitted by the ground station 10 in response to interrogations by other aircraft, which pulses are of no interest to the present aircraft; pulses which are transmitted by the ground station 10 in response to interrogations transmitted by the local DME 46, which pulses are processed internally within the DME 46 to obtain the digital range signals appearing on wires 46a; general noise pulses; and pulses which are of significance in obtaining bearing information such as main reference bursts, which pulse groups need no further consideration in the present disclosure. The local aircraft system must be able to extract from these various groups of pulses those which relate to CAS time synchronization and eliminate the others, and this is accomplished by the circuitry shown in the central portion of FIG. 3. The local clock oscillator 43 supplies on wire 43a clock pulses occurring at a 5 mHz. repetition rate and these pulses are applied through several gates and the wire 43b to a counter chain including a counter 50 which divides these pulses by a factor of 7500:1, so that the pulses appearing on the wire 50a are spaced by 1500 microseconds, namely the duration of one time slot as shown on line B of FIG. 2. The pulses occurring with the 1500 microsecond spacing are then further applied to another counter 52 which divides by a factor of 8:1 to produce pulses on the wire 52a which occur every 12,000 microseconds, and this wire 52a is connected to the "ON" terminal of a flip-flop 53 which then enables an AND gate 55, which when so enabled admits clock pulses from the wire 43a through the wire 55a to the counting input of a range-delay counter 54 which is preset via the wires 46a to read the complement of the digital range and is counted upwardly by said pulses from the five megacycle clock oscillator 43 until the counter 54 reaches overflow, whereupon it delivers an output to the gate generator 56 and also to turn off the flip-flop 53 and reset the delay counter 54. Thus, the upward counting of the preset counter 54 is commenced by each arriving 12,000 microsecond pulse from the counter 52 and is terminated when the counter 54 overflows. The function of the counter 54 is to delay the clock count performed in the aircraft by the same amount of time that the synchronizing pulse from the ground station 10 is delayed by travelling to the aircraft. These two times can be compared on a comparator 58 to determine which occurs first, thereby to determine whether the clock in the aircraft is fast or slow with respect to the CAS synchronization pulses transmitted by the ground station 10 when interrogated by its interrogator 20. The gate generator 56 generates two time gates, corresponding to early and late times for use in the time comparator 58. The time comparator 58 supplies an early or a late output on line 58a or 58b whichever is appropriate. The delay counter 54 is used so that when coincidence is found, the signal on line 52a will be related to the transmitted signal, i.e. the propagation delay due to range will have been accounted for.

The purpose of the counter chain 50, 52 and 54 is to perform a searching or strobing function in an attempt to locate the special synchronization pulses transmitted by the ground station 10 every 12,000 microseconds. When such pulse groups are located, the counter chain 50, 52 and 54 then locks onto them and attempts to maintain synchronization therewith.

In order to prevent spurious outputs from the comparator 58 as a result of occasional coincidences from extraneous signals such as reply signals triggered by other aircraft, an integrating circuit can be utilized in each of the early and late coincidence circuits in the time comparator 58 so that it requires a continuous series of coincidences to create an output on any of the wires 58a or 58b. As previously noted, the interrogation rates of all aircraft are intentionally "jittered" so only the locally initiated reply signals will occur in coincidence gates for significant times. Moreover, the period of the desired signals is chosen so that it is not related to the period of those signals that may be generated by the ground station at a constant repetition rate, and/or frequency such as auxiliary reference bursts.

If neither of the wires, 58a, 58b has an output, this permits gate 79 to route the pulses on wire 68a through OR gate 80 which inserts an extra count into counter 50. The pulse on wire 68a is created by the one shot 68, which is driven from a divide-by 8 counter 66 that is driven from the counter 52 as will be more fully discussed below. That is, counter 52 is counting intervals of 12,000 microseconds, and every eight intervals the one shot 68 applies a pulse through wire 68a to gate 79. If sufficient coincidences have not occurred in the time comparator 58 so that no signal appears on either wire 58a, or 58b, the gate 79 will be uninhibited and will permit the pulse on line 68a to enter the counter 50 through OR gate 80. Thus, as long as coincidence does not occur, the counters 50, 52 and 54 are moved or strobed by one count to provide a "strobing" function every eight intervals of 12,000 microseconds in an attempt to locate the special synchronization pulses transmitted by the ground station 10 every 12,000 microseconds. Conversely, when such pulse groups are located and coincidences occur in time comparator 58, a signal will appear on line 58a, or 58b, and a signal on either of these lines will inhibit gate 79 to prevent the signal on wire 68a from being applied to counter 50, whereby the searching or strobing function will be stopped.

As stated above, when coincidence is detected by the comparator 58, an output will appear on wire 58a or 58b, depending on whether the coincidences are early or late. If the counter chain 50, 52 and 54 is running early, it can be slowed somewhat by skipping one or more input pulses on the wires 43a and 43b to the first counter 50, this being accomplished by inhibiting a normally conductive gate 62 by providing an inhibit signal on the wire 64a coming from the AND gate 64 enabled by the output on wire 58a, namely the "early" output from the comparator 58. It is desirable to make only a small correction in the counter chain at any one time and therefore another 8:1 dividing counter 66 is driven by the 12,000 microsecond spaced pulses from the counter 52 to provide a corrective count pulse only every 96,000 microseconds. A one-shot 68 is provided at the output of the divide by 8 counter 66 to provide a pulse width on the wires 68a of duration long enough to include just one clock pulse from the main oscillator 43 on the wire 43a. Therefore, when an early signal appears on wire 58a, to enable the AND gate 64, a pulse will be provided on the wires 68a which will pass through the gate 64 and inhibit the gate 62 just long enough for one of the main clock oscillator pulses on wire 43a to be omitted, thereby throwing the clock counter chain slightly later in an effort to bring it into synchronization with the phase of the pulses being decoded by the special decoder 60 and representing every eighth time slot. By this means, as long as the range delay count in the counter chain 50, 52 and 54 is later than the earlier synchronization pulse group from the decoder 60, the counter chain 50, 52, 54 will be made later and later in time, until it becomes coincident therewith.

Conversely, if the count in the chain 50, 52 and 54 is late with respect to the synchronization pulse groups being decoded in the decoder 60, then additional pulses should be added to the wire 43 to advance the count in the chain 50, 52, and 54 and bring it into step. This is accomplished when an enabling signal appears on the wire 58b to enuable the AND gate 70 and therefore allow a pulse from the one-shot 68, when it occurs, to pass through the gate 70 and through the OR gate 72, and thereby be applied to the wire 43b in addition to the normal clock oscillator pulses on wire 43a, thereby increasing the rate of the counter chain 50, 52 and 54 and tending to make it catch up with the synchronization pulse groups being decoded by the special decoder 60. When actual coincidence of the signals on the wires 56a and 60a occurs, the operation from then on will tend to cause the comparator 58 to dither back and forth every few pulses, sometimes adding a little to the count of the chain 50, 52 and 54, and at other times subtracting a little from the count of the chain 50, 52 and 54, but generally keeping it in close step with the marker pulses being decoded by the decoder 60.

It is not enough that every twelfth time slot be synchronized but in addition the beginning of each new epoch must be recognized and synchronized. The accomplishment of the recognition of each new epoch takes place by using the counter 74 to divide the 1500 microsecond-spaced pulses from the counter 50 by a factor of 4000:1 to produce an output on wire 74a once per six second time interval of every-other epoch, this count serving to reset the main time clock counter 44 to zero. It then becomes a matter of determining the correct time slot period in which to make this epoch reset, and this is accomplished by taking the video signal on the wire 46b and decoding ti to find the code #3 and code #2 pulse groups indicating the penultimate and the final pulse groups of every other masterclock epoch. The next to the last pulse group is decoded by the decoder 76 and the last by decoder 78, and both of these groups are used to reset the counter 74 respectively to 12,000 microseconds before the end of the epoch and to 0 microsecond at the end of the epoch.

As a matter of fact, either one of these resets would be adequate to determine position within an epoch, but because of the possibility that one or the other of these code #2 or code #3 pulse groups might become momentarily lost or obscured by other reference pulses transmitted by the ground station 10, the use of both pulse encodings increases the certainty that the end of an epoch will be properly recognized. Thus, the counter 74 is reset to 12,000 microseconds before the end of a six second interval by the signal appearing on wire 76a, and the counter 74 is again reset, this time to 0 by the signal appearing on wire 78a, assuming that both signals are present and decoded. If either is missing, the system will still operate normally to produce a reset pulse on the wire 74a to reset the main CAS time slot counter 44 to 0 at the beginning of an epoch.

The early-late signals appearing on wires 58a and 58b can also be applied to a suitable frequency-control circuit in the clock pulse oscillator 43 to drag its oscillation rate slightly up or slightly down thereby improving the rate of oscillation always toward synchronism of the clock 43-44 with the CAS synchronizing pulses being transmitted by the ground station 10 in response to interrogations by the interrogator 20 as described above. The type of clock pulse oscillator whose frequency can be dragged by addition or subtraction of small increments of voltage, such as might be obtained by integrating pulses, it is a suitable voltage-controlled oscillator which is generally quite well known in the prior art and is frequently used in systems of the present type.

The above specific examples serve to illustrate the invention, but there are many other ways in which the aircraft could recognize synchronization signals transmitted by the ground station 10. The principle of interrogating standard VOR/DME, TACAN or VORTAC ground stations by an interrogator located nearby will work satisfactorily with various other airborne systems for recognizing synchronization pulses which are transmitted by the ground station in the presence of numerous reference and DME pulses.

I claim:

1. In combination with at least one participating ground station of the VOR/DME, TACAN or VORTAC types each including a transponder responsive to interrogation signals from mobile units to provide DME reply signals indicative of range to the mobile units, means for triggering such participating ground station to provide mobile unit clock synchronization signals representing the moments of occurrence of predetermined events in repeating time cycles initiated by master clock means on the ground, comprising:
   (a) interrogating means associated specifically with the participating ground stations and operative to interrogate their transponders to trigger reply signals therefrom, and
   (b) actuating means driving each interrogating means and controlled by said master clock means for actuating said interrogating means to trigger predetermined groups of reply signals which are fixed in time relationship with respect to said moments of said repeating cycles and which groups are uniquely identifiable by mobile units as clock synchronization signals.

2. In a combination as set forth in claim 1, said interrogating means each comprising a transmitter of pulses associated with the moments of said events, and said actuating means having means controlled by the master clock means to actuate the interrogating means earlier than the occurrence of said events by increments of time selected to compensate fixed delays in the ground station transponder replies which include propagation time of said interrogating pulses to the ground station and inherent transponder delays of the latter.

3. In a combination as set forth in claim 1, said interrogating means comprising a pulse transmitter, and said actuating means comprising encoder means for initiating said interrogating means to transmit each interrogation as a pulse group coded to uniquely identify said events of the repeating cycle to thereby trigger similarly coded reply pulse groups.

4. In a combination as set forth in claim 3, said cycle including repeating epochs of time slots and said events comprising momentary time boundaries thereof, and said encoder means initiating coded pulse groups uniquely identifying at least one of said momentary boundaries in an epoch.

5. In a combination as set forth in claim 4, said encoder means including means for initiating at least two different types of coded groups, one type representing boundaries of pre-selected time slots occurring plural times during each epoch, and another type representing boundaries of successive epochs.

6. In a combination as set forth in claim 3, said mobile units comprising:
   (a) DME mobile means for measuring the range to the ground station transponder and delivering outputs representative thereof;
   (b) means for receiving said coded pulse clock synchronization signals delayed by the propagation time over said range;
   (c) local time clock means including means for counting out a time cycle having momentary events similar to those initiated by the master clock means and delivering timing signals representative of their occurrence;
   (d) comparator means responsive to the relative times of occurrence of timing signals and synchronization signals representative of corresponding events, and including means responsive to said DME outputs for compensating out the said propagation delay of the latter signals, said comparator delivering correction signals; and
   (e) means responsive to said correction signals for correcting the local time clock means toward elimination of differences in said compensated times of occurrence.

7. In a combination as set forth in claim 6, the time cycles of said master clock and of said local clock both comprising repeating epochs of time slots, and said events comprising momentary time boundaries thereof, and said pulse groups including first groups encoded by said interrogating means to represent boundaries of plural preselected time slots recurring in fixed mutual relationship during an epoch; and said mobile unit including first pulse group decoder means coupled to said receiving means and responsive to recognize said first groups and deliver first synchronization signals to said comparator means.

8. In a combination as set forth in claim 6, the time cycles of said master clock and of said local clock both comprising repeating cyclic time-slot epochs, and said events comprising time boundaries of said epochs, and said pulse groups including second groups encoded by said interrogating means to represent said boundaries; and said mobile unit including second pulse-group decoder means coupled to said receiving means and responsive to recognize said second groups and actuate said correcting means to commence the counting out of a new epoch.

9. In a combination as set forth in claim 8, said second pulse groups representing the end of the last time slot in an epoch, and said pulse groups including third groups encoded by said interrogating means to represent a time slot boundary just prior to an epoch boundary; and said mobile unit including third pulse group decoder means coupled to said receiving means and responsive to recognize said third groups and actuate said correcting means to commence counting out of a new epoch after the elapse of the time between second and third pulse groups.

10. In a combination as set forth in claim 6, said mobile unit means including counter means driven by a clock pulse oscillator which also drives the local time clock means, said counter means counting out the timing of said events; said compensating means comprising a delay circuit responsive to said DME outputs to delay the issuance of timing signals relating to said events in proportion to measured DME range, and said means responsive to said correction signals comprising early/late gate means connected to receive the latter and responsive thereto to slow or increase the clock pulse oscillator rate.

References Cited

UNITED STATES PATENTS

| | | | |
|---|---|---|---|
| 3,128,465 | 4/1964 | Brilliant | 343—7.5 X |
| 3,222,672 | 12/1965 | Forestier | 343—7.5 |
| 3,262,111 | 7/1966 | Graham. | |
| 3,440,652 | 4/1969 | Bates et al. | 343—6.5 X |

RODNEY D. BENNETT, JR., Primary Examiner

M. F. HUBLER, Assistant Examiner

U.S. Cl. X.R.

343—7.5